US007664081B2

(12) United States Patent
Luoma et al.

(10) Patent No.: US 7,664,081 B2
(45) Date of Patent: Feb. 16, 2010

(54) WIRELESS GATEWAY FOR ENABLING WIRELESS DEVICES TO DISCOVER AND INTERACT WITH VARIOUS SHORT-RANGE SERVICES/DEVICES

(75) Inventors: Juha-Pekka Luoma, Tampere (FI); Mika Saaranen, Tampere (FI); Tero T. Kakkainen, Tampere (FI); Timo K. Perala, Helsinki (FI)

(73) Assignee: Nokia Corporation, Espoo (FI)

( * ) Notice: Subject to any disclaimer, the term of this patent is extended or adjusted under 35 U.S.C. 154(b) by 781 days.

(21) Appl. No.: 11/018,353

(22) Filed: Dec. 22, 2004

(65) Prior Publication Data

US 2006/0133414 A1    Jun. 22, 2006

(51) Int. Cl.
H04W 4/00 (2006.01)
H04L 12/28 (2006.01)
H04J 3/16 (2006.01)
(52) U.S. Cl. .................. 370/338; 370/401; 370/466
(58) Field of Classification Search .......... 370/338, 370/401, 466; 709/223–226, 229
See application file for complete search history.

(56) References Cited

U.S. PATENT DOCUMENTS

| 5,809,028 | A | 9/1998 | Nethercott et al. |
| 6,278,697 | B1 | 8/2001 | Brody et al. |
| 6,452,910 | B1 | 9/2002 | Vij et al. ............... 370/310 |
| 6,768,896 | B2 | 7/2004 | Tjalldin et al. ........... 455/11.1 |
| 7,136,709 | B2* | 11/2006 | Arling et al. ............... 700/65 |
| 2003/0228842 | A1* | 12/2003 | Heinonen et al. ......... 455/41.2 |
| 2003/0231641 | A1* | 12/2003 | Ryoo ..................... 370/401 |
| 2005/0272449 | A1* | 12/2005 | Gallagher et al. ......... 455/458 |

FOREIGN PATENT DOCUMENTS

| EP | 0821507 A1 | 1/1998 |
| EP | 0821507 A2 | 1/1998 |
| EP | 1361713 A1 | 11/2003 |
| WO | WO 9933226 | 7/1999 |

OTHER PUBLICATIONS

International Search Report (May 2, 2006).
"Bluetooth Connect Without Cables" Second Edition by J. Bray and C. F. Sturman, published by Prentice Hall PTR, Upper Saddle River, New Jersey 07458 pp. 25-148/511-512 (2000, 2001) (ISBN-13-066101-6).
"Wireless Lans Implementing Interoperable Networks" by J. Geier, published by McMillian Technical Publishing, New York, NY, Chapter 3, (1999) (Library of Congress Book No. 1-57870-081-7).

* cited by examiner

Primary Examiner—Nittaya Juntima
(74) Attorney, Agent, or Firm—Locke Lord Bissell & Liddell

(57) ABSTRACT

A portable gateway apparatus communicates with devices coupled to a first network and devices coupled to at least a second network. The gateway provides an interface to a mobile phone to discover services/devices within both the first and the at least second networks and interacts with them. The mobile phone includes a service/content directory enabling a user to select preferred services. The gateway conducts service discovery to identify services and devices responsive to the user request. The services and description are provided to the user for selection, after which a service-specific interface is displayed to enable the mobile phone to control the execution of the discovered services.

31 Claims, 8 Drawing Sheets

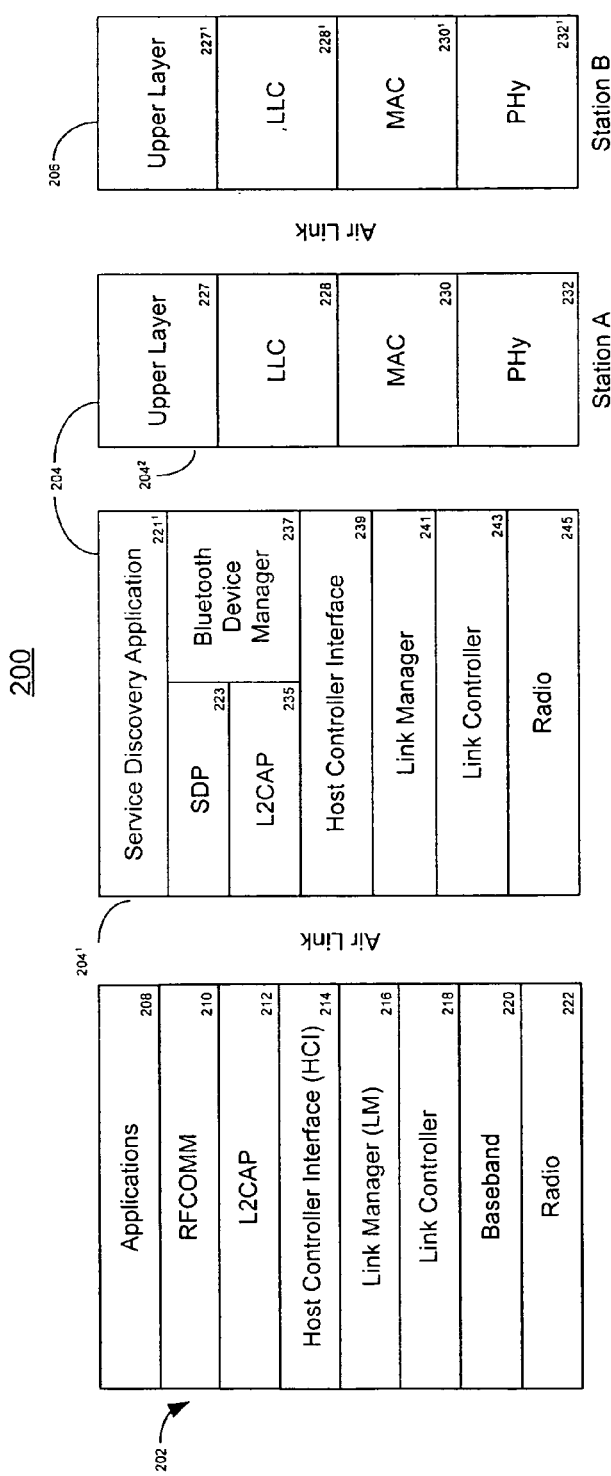
Figure 2A
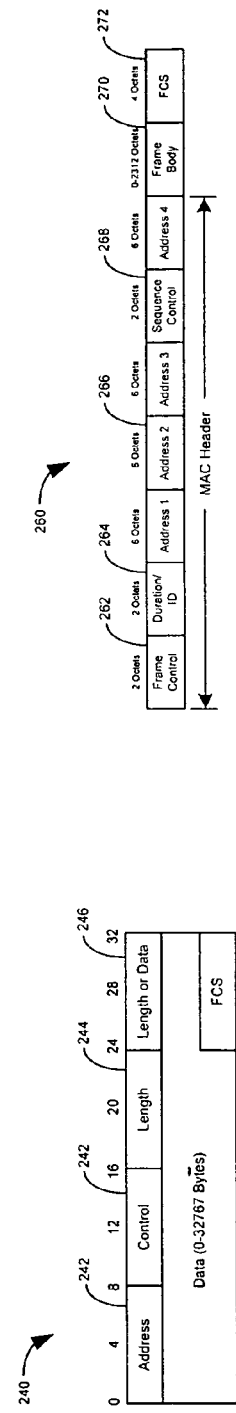
Figure 2C
Figure 2B

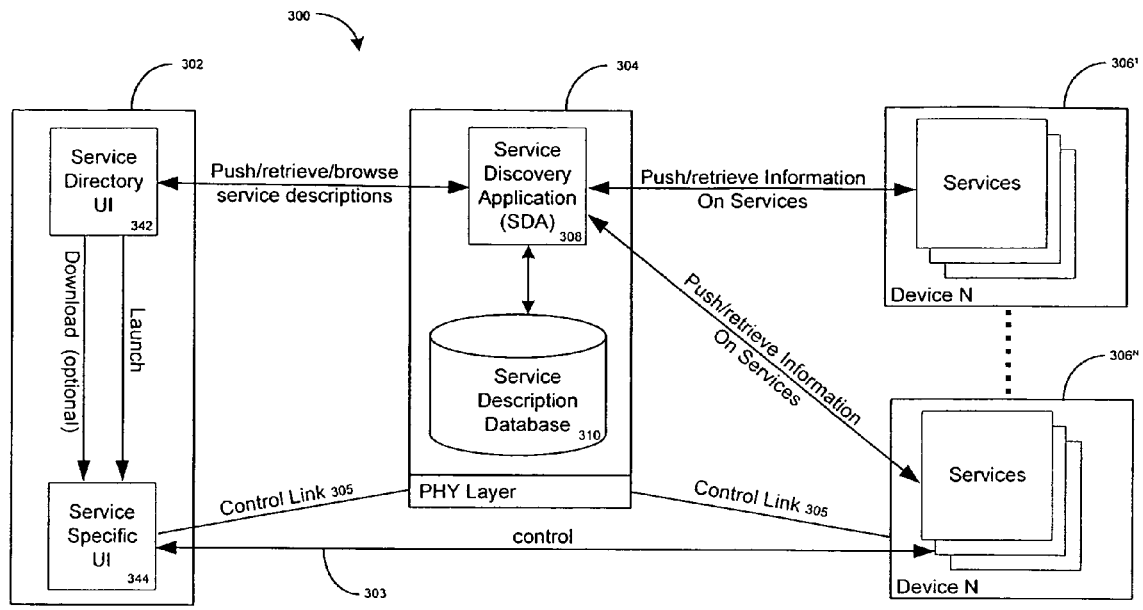
Figure 3
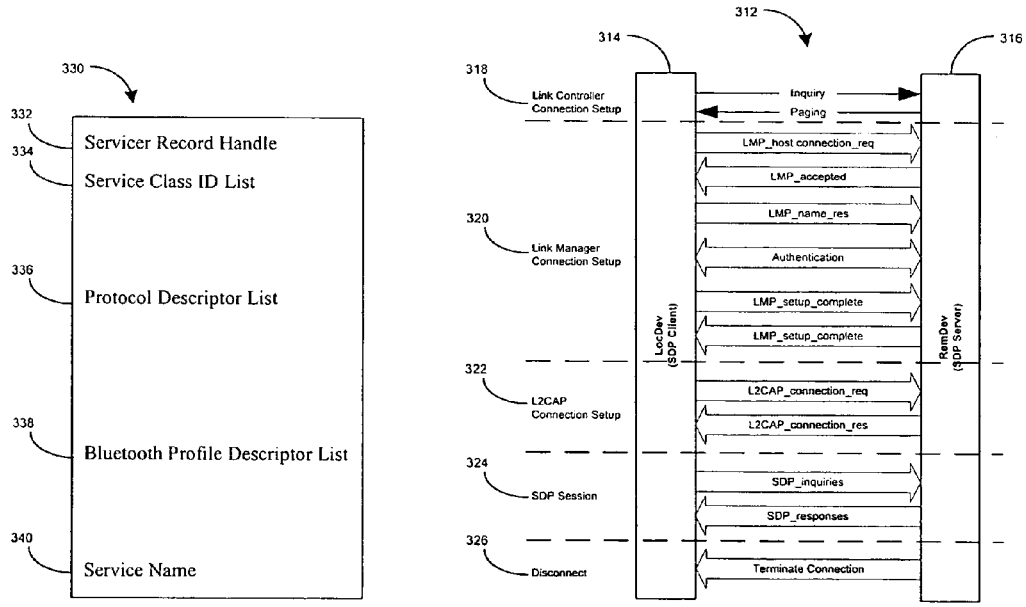
Figure 3B
Figure 3A

WIRELESS GATEWAY FOR ENABLING WIRELESS DEVICES TO DISCOVER AND INTERACT WITH VARIOUS SHORT-RANGE SERVICES/DEVICES

BACKGROUND OF INVENTION

1. Field of Invention

This invention relates to communication systems, methods and devices. More particularly, the invention relates to wireless gateways for improving discovery of local services and devices and interacting with the discovered services and devices.

2. Description of Prior Art

A home networking environment for Audio Visual (AV) and other devices is being standardized at forums like UPnP, and the Digital Living Network Alliance (DLNA). The connectivity media considered to be most popular among the Consumer Electronics (CE) manufacturers are WLAN and Ethernet. Also, the media format most likely to be adopted will be MPEG2. The AV environment will include an increasing amount of devices providing services and connectivity over wireless links (e.g. Bluetooth, WLAN). Homes will become fully networked. The AV equipment, as an example, will have wireless connectivity; support service discovery and utilize standardized methods of controlling the equipment.

Presently, mass market phones do not implement the core technologies required by the home networking described above. This case is most likely to prevail for quite a while due to techno-economic reasons. WLAN is too expensive to implement on mass market terminals, and MPEG2 media format being too computationally intensive for the processing capacity of such devices. On the contrary, the mass market mobile phones will implement Bluetooth wireless technology and support MPEG4 media format.

What is needed in the art is a logical Gateway implementing various short-range communication protocols, such as, for example, Bluetooth, Ultra Wideband and Wireless Local Area Network (WLAN), supporting various media formats such as, for example MPEG 2 and MPEG 4, and serving as a control point for a proximity/home environment, the Gateway providing not only connectivity, but also media conversion, and functioning as a service directory.

Prior art related to Gateways includes:

1. U.S. Pat. No. 6,768,896 B2 entitled "Wireless systems internet gateway", issued Jul. 27, 2004, filed Jan. 4, 2001 discloses a portable gateway designed to be a bridge between a Bluetooth network and a Wireless Local Area Network (WLAN). The portable gateway has at least one and preferably two slots for receiving a PC Card or a Compact Flash Card. By means of selecting suitable PC Cards the portable gateway can bridge between any wireless networks. The gateway preferably comprises an embedded server for distributing parameters relating to the different networks, such as network names, user name and password and also other parameters regarding for example security. The server is accessed from a remote input wireless terminal, such as mobile telephone.

2. U.S. Pat. No. 6,452,910 B1 entitled "Bridging Apparatus for Interconnecting a Wireless PAN and a Wireless LAN", issued Sep. 17, 2002 discloses a wireless bridge conjoins two previously incompatible technologies within a single device to leverage the strengths of each. The wireless bridge marries the Personal Area Network (PAN) technology of Bluetooth as described in Bluetooth Specification Version 1.0B with the Wireless Local Area Network (WLAN) technology described in the IEEE 802.11 (a) specification to provide a wireless system level solution for peripheral devices to provide Internet service interactions. A single working device implements these technologies so they do not interfere or disrupt the operation of each other and instead provide a seamless transition of a Bluetooth connection to Wireless Local Area Network/Internet connection. The wireless bridge extension allows a Bluetooth-enabled device to roam from one Wireless Access Point (bridge) to the next without losing its back end connection. The bridge takes into account the minimum separation and shielding required of these potentially conflicting technologies to inter-operate.

None of the prior art discloses a gateway providing connectivity, conducting media conversion and/or service/device discovery and providing a user interface to a device operating in a first wireless network to interact with at least one service/device operating in a second wireless network.

SUMMARY OF INVENTION

In one embodiment, a portable gateway, capable of communicating with WLAN and Bluetooth phones or terminals, provides an interface to the Bluetooth mobile phone or terminal to discover services/devices accessible via WLAN and interact with them without having a WLAN interface. The gateway, in addition to providing a bridge between two different wireless networks (Bluetooth/WLAN), conducts necessary service/device discovery for discovering available services/devices on the WLAN side of the bridge, and provides a tailored user interface on the Bluetooth side of the bridge for interacting with the services/devices on the WLAN side of the bridge. (Bluetooth mobile phone can request for available WLAN-based services). The gateway is capable of communicating with the WLAN devices and requesting/maintaining a user interface for interacting with the services/devices. The suitable user interface is then pushed to the requesting device over a Bluetooth connection. In addition, a protocol conversion (MPEG 4/MPEG 2) tailors the user interface from WLAN to be suitable for use by Bluetooth devices . . .

In another embodiment, a personal mobile gateway is paired with a phone (same owner for both devices). The gateway is constantly monitoring and actively querying available services and nodes in its (close physical) proximity in accordance with any limitations of the energy saving policy used. The gateway keeps record of found services that can be updated based on various methods such as service discovery protocols, monitoring network traffic (e.g. AODV route discovery) etc. The recorded information is converted into a suitable format such as XML, Java Applet, MacroMedia Flash, WML or HTML document. The document is pushed over Bluetooth to the phone (i.e. the device offering a GUI to the user). One mechanism for pushing the document may be OBEX, which provides the required capabilities for document transfer. At least three different profiles of when to push the information can be established: (1) periodically, (2) when changes have happened or some pre-selected information is available, and (3) by manual request. When the document is received and browsed by the user, the selection initiates a gateway user interface at relevant choices. Actual service discovery application/application using the service would typically be located in the gateway and the phone itself would be unmodified. However, after the services have been located, suitable applets or links maybe transferred into the phone itself.

In still another embodiment, a gateway is linked to a mobile device (phone) via a Bluetooth link and to AV devices via a WLAN link. The phone includes a display and receives a set of service/content descriptions from the gateway. The descriptions sent by the gateway to the phone contain information on services/content discovered by the gateway. The phone renders the descriptions as a service guide to the user. The main output device for a User Interface (UI) rendering would be the phone display. However, a voice synthesis output with or without voice recognition input may be used as an alternative to a fully visual UI. Any additional services/content discovered by the phone can be either presented in the UI separately from the services discovered by the gateway, or can be combined so as to provide a uniform "UI-view" to the available services/content regardless of how they were discovered.

In still another embodiment, a gateway serving at least one Bluetooth network is coupled to an Unlicensed Mobile Access (UMA) controller, via a WLAN AP network. The controller is coupled to the Internet and serves multiple WLAN AP networks and a cellular network. The controller serves as a gateway between the WLANs networks and the cellular network. The controller provides cellular network subscriber access to cellular networks through short-range communication networks independent of the current access point servicing the subscribers, and enables subscribers to obtain VoIP services.

In one aspect, the gateway provides connectivity and media conversion for enabling a wireless device (e.g. a Bluetooth phone) to discover and interact with short-range wireless services/devices in a bearer-and media format agnostic manner (i.e. the gateway provides means to interact with e.g. services and devices that communicate over e.g. Bluetooth, WLAN and/or Ultra Wideband (UWB)), the gateway handling necessary communication protocols and/or media conversions.

In another aspect, the gateway operates as an access point capable of servicing a plurality of devices in a home, the gateway having e.g. a list of "suitable" devices enabling all family members to control the devices with their mobile phones.

In another aspect, the gateway provides a wireless device extended connectivity and protocol conversion to at least a third wireless network; an information distribution network and a cellular network via a UMA controller.

In another aspect, the gateway monitors network routing messages to determine available nodes.

In another aspect, if so decided by the user, the gateway can query available services from the nodes and construct a multi-level document of the services.

In another aspect, unmodified phones may be used in controlling various devices located by the gateway without any SW modifications in the phone.

In another aspect of the invention, the recorded information by the gateway is converted into a suitable format such as XML, Java Applet, MacroMedia Flash, WML or HTML document for transfer to the phone.

In another aspect, the gateway, in addition to network links includes a service discovery application and a service description database.

In another aspect, the gateway pushes or retrieves information or services to/from AV devices linked to a WLAN.

DESCRIPTION OF DRAWINGS

The invention will be further understood from a description of a preferred embodiment, taken in conjunction with appended drawings, as follows:

FIG. 2A is a representation of software protocols implemented in the mobile device; gateway and support services/devices of FIG. 1 according to an embodiment of the present invention enabling Bluetooth devices to discover and interact with WLAN based devices;

FIG. 2B is a representation of a Bluetooth message format transmitted and received between the mobile phone and the gateway in the system of FIG. 1;

FIG. 2C is a representation of an IEEE 802.11 message format transmitted and received between the gateway and service/support device in the system of FIG. 1;

FIG. 3 is a representation of a gateway linked to a mobile phone via a first network linked to and providing services to an AV device via a second network under control of the mobile device of FIG. 1 according to an embodiment of the present invention;

FIG. 3A is representation of a service discovery process for the system of FIG. 1 according to an embodiment of the present invention;

FIG. 3B is a representation of a service description record for the gateway of FIG. 1 according to an embodiment of the present invention;

DESCRIPTION OF PREFERRED EMBODIMENT

Figure 1:
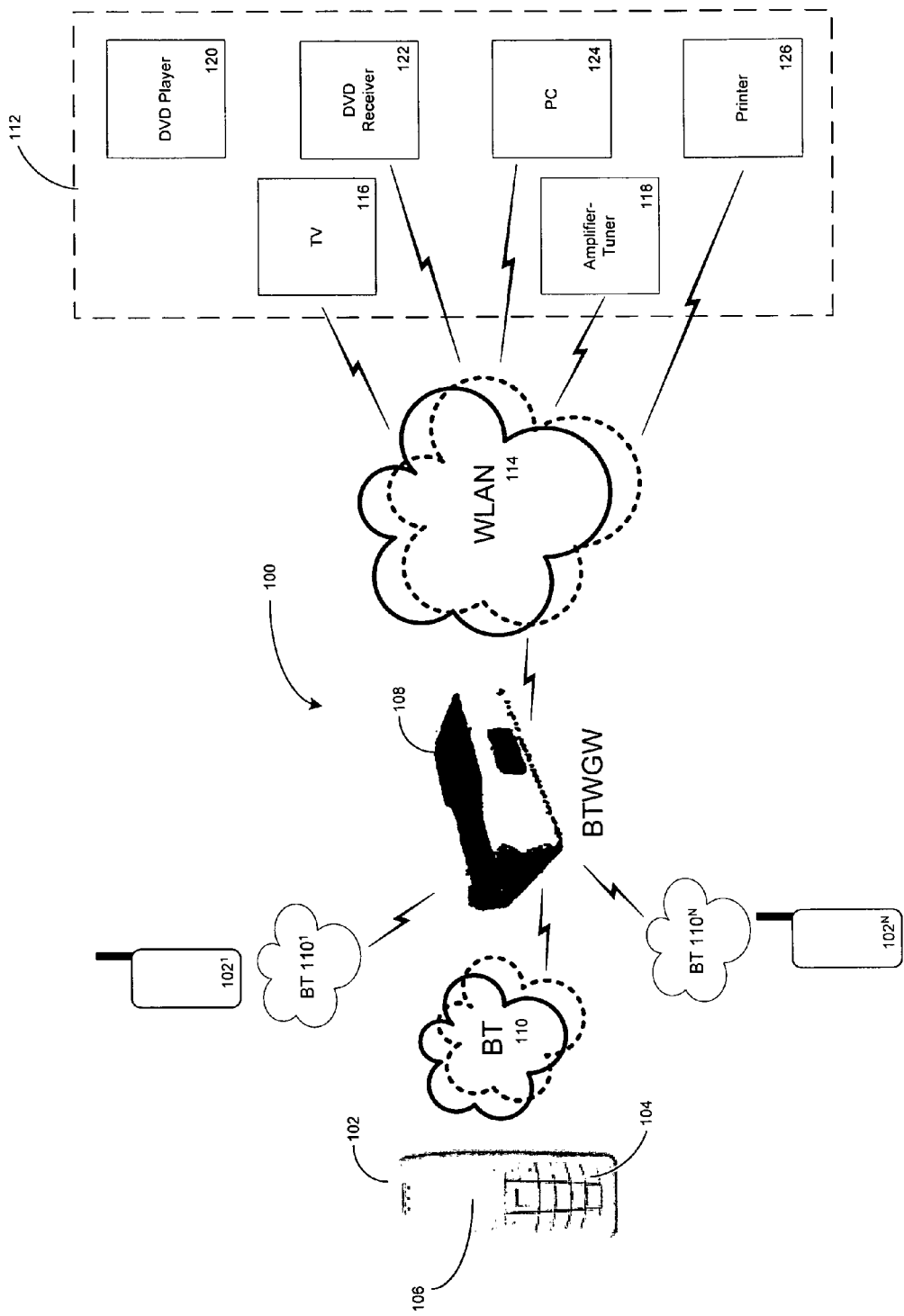
FIG. 1 is a representation of a system implementing and incorporating the principles of a wireless gateway for Bluetooth devices discovering and interacting with WLAN based services/devices without having a WLAN interface according to an embodiment of the present invention.

Before describing the wireless gateway of the present invention, a brief review of short range wireless systems, such as, for example the Bluetooth, IEEE 802.11 and HiperLan is believed beneficial as further background for the invention.

Short Range Wireless Systems:

Short range wireless systems have a typical range of one hundred meters or less. They often combine with systems wired to the Internet to provide communication over long distances. The category of short range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of a few tens of meters. The best known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 1-54 MBps (802.11 to 802.11a) and have a longer range, which requires greater power consumption. Wireless local area networks are typically used as wireless links from portable laptop computers to a wired LAN, via an access point (AP). Examples of wireless local area network technology include the IEEE 802.11 family of Wireless LAN Standards and the HiperLAN Standard, which operates in the 5 GHz U-NII band.

The Bluetooth Short Range Wireless Technology:

Bluetooth is a short range radio network, originally intended as a cable replacement. It can be used to create networks of up to eight devices operating together (with scatternet this can be extended). The Bluetooth Special Interest Group, Specification of the Bluetooth System, Volumes 1 and 2, Core and Profiles: Version 1.1, Feb. 22, 2001, describes the principles of Bluetooth device operation and communication protocols. (Core release version 1.2, Nov. 5, 2003 exists. Profiles have been separated from the Core, and follow independent release schedules.)The devices operate in the 2.4 GHz radio band reserved for general use by Industrial, Scientific, and Medical (ISM) applications. Bluetooth devices are designed to find other Bluetooth devices within their radio communications range and to discover what services they offer, using the Service Discovery Protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. This process is relatively fast, typically being completed in approximately from one to five seconds. Then the Logical Link Control and Adaptation Protocol (L2CAP) layer in the transport protocol group passes the link status up to the layers in the middleware protocol group. The SDP searching function in the middleware protocol group can then be used to find out about application programs in the responding Bluetooth device that may provide desired services. The SDP searching function can require several seconds to complete, depending on the complexity of the search and the size of the device's registry.

An example application program service that can be discovered by the SDP searching function is the Wireless Application Environment (WAE) graphical user interface (GUI) function of the Wireless Application Protocol (WAP). WAP-enabled wireless devices can use a microbrowser to display content on a small screen of the device. WAP uses a combination of Internet protocols with other protocols especially modified to work with mobile devices. The Internet protocols are: Point to Point Protocol (PPP), Internet Protocol (IP), and User Datagram Protocol (UDP). The special mobile device protocols are: Wireless Transport Layer Security (WTLS), Wireless Transaction Protocol (WTP), Wireless Session Protocol (WSP), and Wireless Application Environment (WAE). It is the WAE that provides the microbrowser user interface for WAP. In order to establish a connection to send content from the requesting access point device to the WAE microbrowser of the responding user's device, each of the WAP protocol layers WTLS, WTP, WSP, and WAE must be established, which can require several more seconds to complete and possibly significant user interaction on the way.

It can be seen that if the user's mobile Bluetooth device has enough speed to travel across the communications area of the Bluetooth access point before completing downloading data from a network server, the contact with the server will be irretrievably lost.

The IEEE 802.11 Wireless LAN Standard:

The IEEE 802.11 Wireless LAN Standards define at least two different physical (PHY) specifications and one common medium access control (MAC) specification. The IEEE 802.11(g/a) Standard is designed for either the 2.4 GHz ISM band or the 5 GHz U-NII band, and uses orthogonal frequency division multiplexing (OFDM) to deliver up to 54 Mbps data rates. The IEEE 802.11 (b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can be configured where the mobile stations communicate with a fixed access point. IEEE 802.11 also supports distributed activities similar to those of the Bluetooth piconets. The IEEE 802.11 standard provides wireless devices with service inquiry features similar to the Bluetooth inquiry and scanning features.

In order for an IEEE 802.11 mobile station to communicate with other stations in a network, it must first find the stations. The process of finding another station is by inquiring. Active inquiry requires the inquiring station to transmit queries and invoke responses from other wireless stations in a network. In an active inquiry, the mobile station will transmit a probe request frame. If there is a network on the same channel that matches the service set identity (SSID) in the probe request frame, a station in that network will respond by sending a probe response frame to the inquiring station. The probe response includes the information necessary for the inquiring station to access a description of the network. The inquiring station will also process any other received probe response and Beacon frames. Once the inquiring station has processed any responses, or has decided there will be no responses, it may change to another channel and repeat the process. At the conclusion of the inquiry, the station has accumulated information about the networks in its vicinity. Once a station has performed an inquiry that results in one or more network descriptions, the station may choose to join one of the networks. The IEEE 802.11 Wireless LAN Standard is published in three parts as IEEE 802.11-1999; IEEE 802.11a-1999; and IEEE 802.11b-1999, which are available from the IEEE, Inc. web site http://grouper.ieee.org/groups/802/11.

In the case of IEEE 802.11 mobile stations, if the user's mobile device has enough speed to travel across the communications area of the IEEE 802.11 access point before completing downloading data from a network server, the contact with the server will be irretrievably lost.

High Performance Radio Local Area Network (Hiperlan):

The HiperLAN standard provides a wireless LAN with a high data rate of up to 54 Mbps and a medium-range of 50 meters. HiperLAN wireless LANs provide multimedia distribution with video QoS, reserved spectrum, and good inbuilding propagation. There are two HiperLAN standards. HiperLAN Type 1 is a dynamic, priority driven channel access protocol similar to wireless Ethernet. HiperLAN Type 2 is reserved channel access protocol similar to a wireless version of ATM. Both HiperLAN Type 1 and HiperLAN Type 2 use dedicated spectrum at 5 GHz. HiperLAN Type 1 uses an advanced channel equalizer to deal with intersymbol interference and signal multipath. HiperLAN Type 2 avoids these interference problems by using OFDM and a frequency transform function. The HiperLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30-50 Mbps.

The HiperLAN Type 1 is a dynamic, priority driven channel access protocol that can form networks of wireless devices. HiperLAN Type 1 networks support distributed activities similar those of the Bluetooth piconets and IEEE 802.11 independent basic service sets (IBSS). The HiperLAN Type 1 standard provides wireless devices with service inquiry features similar to those of the Bluetooth inquiry and scanning features and the IEEE 802.11 probe request and response features. An overview of the HiperLAN Type 1 principles of operation is provided in the publication HiperLAN Type 1 Standard, ETSI ETS 300 652, WA2 December 1997.

HiperLAN Type 2 is a reserved channel access protocol that forms networks. HiperLAN Type 2 networks support distributed activities similar those of the HiperLAN Type 1 networks, Bluetooth piconets and IEEE 802.11 independent basic service sets (IBSS). HiperLAN Type 2provides high speed radio communication with typical data rates from 6 MHz to 54 Mbps. It connects portable devices with broadband networks that are based on IP, ATM and other technologies. Centralized mode is used to operate HiperLAN Type 2 as an access network via a fixed access point. A central controller (CC) in the fixed access point provides QoS coordinates the access of the mobile stations support. User mobility is supported within the local service area and wide area roaming mobility can also be supported. An overview of the HiperLAN Type 2principles of operation is provided in the Broadband Radio Access Networks (BRAN), HiperLAN Type 2; System Overview, ETSI TR 101 683 VI.I.1 (2000-02) and a more detailed specification of its ad hoc network architecture is described in HiperLAN Type 2, Data Link Control (DLC) Layer; Part 4. Extension for Home Environment, ETSI TS 101 761-4 V1.2.1 (2000-12).

Now turning to the invention, FIG. 1 is a representation of a system 100 implementing a wireless gateway for Bluetooth phones or terminals to discover and interact with WLAN services/devices according to an embodiment of the present invention. It should be noted, that according to alternative embodiments, the wireless device may provide an interface to interact also with other type of wireless short range services/devices, such as, for example Ultra Wideband (UWB) services/devices as one non-limiting example. A standard mobile phone 102, typically a Nokia model 6340, for example, includes a keyboard 104 and a display 106, and is wirelessly linked to a Bluetooth wireless gateway 108, hereafter, "gateway" via a piconet 110. The gateway can serve multiple piconets $110^1 \ldots 110^N$ and mobile phones $102^1 \ldots 102^N$. In one embodiment, the gateway is a portable device, carried by the user, and air linked to a home network 112, via a wireless local area network 114. Included in the home network are, for example, a TV 116; an amplifier tuner 118; a DVD player 120; a DVD receiver 122; a PC 124; and, a printer 126. Each of the devices is under the control of the mobile device 102, as will be described hereinafter.

The gateway 108 is adapted to perform functionality, as follows:

1. Serve as a Bluetooth-WLAN activity gateway, the mobile phone implementing Bluetooth and consumer electronic devices in a home network implementing WLAN interfaces;

2. Conduct media conversion between MPEG 4 format supported by the mobile phone and MPEG 2 format supported by home network devices;

3. Locate devices (device discovery) and find services provided by and/or hosted by services devices (service discovery) in the home network and capable of delivering information to the mobile phone; and, 4. Store user interfaces, for example, "Nokia Series 60 TV UI", etc. deployed in the home network, and capable of uploading the relevant UI to the mobile phone in order for the mobile phone to act as the controller of the consumer electronic device;

In another embodiment, the gateway can be a standalone device or natural proximity communication extension for the mobile phones, and extend the abilities of legacy phones. The gateway supports routing communications between the network 110 and the home network 112, via a WLAN 114; forms ad hoc networks between other communications devices, and serves as a control point for proximity/home environments, providing not only connectivity, but also functioning as a service directory and control point. As the gateway is a device without user interface, but adequate amount of memory and processing power, the natural interface is a mobile phone that would typically be continuously paired with a personal gateway, especially the gateway of the present invention.

Figure 2:
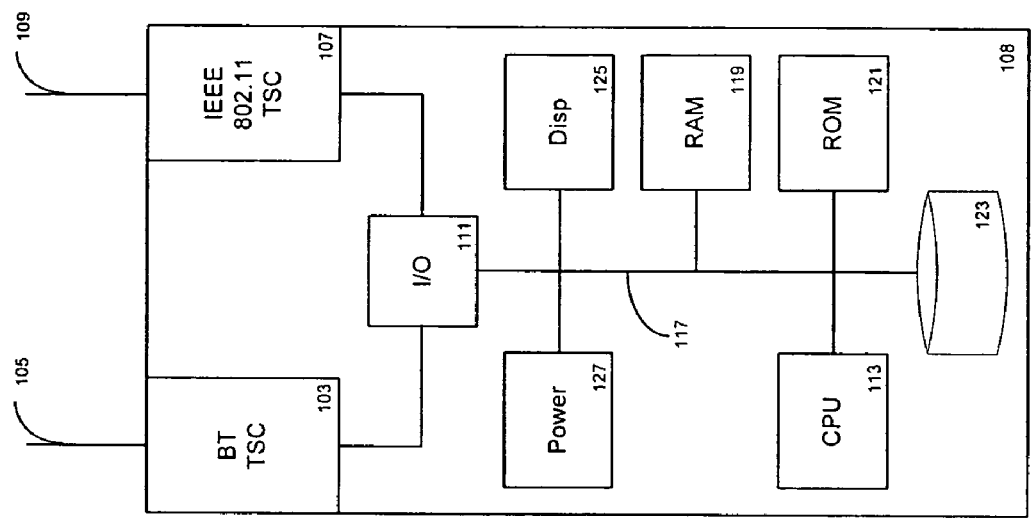
FIG. 2 is a representation of the wireless gateway included in FIG. 1 according to an embodiment of the present invention.

FIG. 2 describes an embodiment of the gateway 108, in more detail. Included in the gateway are a Bluetooth transceiver 103 and antenna 105 and IEEE 802.11 transceiver 107 and antenna 109. It should be noted that the present invention is not limited only to Bluetooth and IEEE 802.11 technologies, so also other transceivers and antennas may be included in the gateway depending on the embodiment. The transceivers are coupled to an I/O circuit 111 linked to a central processing unit 113 via a buss 117. A dynamic RAM memory 119 is connected to the buss and inter alia supports the execution of operating program software; communication protocols; provides buffers for the data exchanged between the gateway, phone and home device. A read only memory 121 stores application programs, e.g. service discovery protocol; supports the static codes and variables required for executing programs and diagnostic test programs and stores user interfaces, for example, "Nokia Series 60 TV UI", etc. deployed in the home network, and capable of uploading the relevant UI to the mobile phone in order for the mobile phone to act as the controller of a consumer electronic device. A service description database 123 is coupled to the bus 117 and stores records of services and devices, including related information and user interfaces available to a user via the gateway. An example of a service record will be described in connection with FIG. 3B. According to one embodiment of the present invention, additionally a display 125 is provided in the gateway and serviced by the CPU and under user control displays a user interface for controlling a service and/or home device as will be described in conjunction with FIG. 4. A power supply 127 provides the power for operating the various units of the gateway. The units 111, 113, 119, 121, 123, and 125 may be fabricated as a chip set by a semiconductor foundry which has various semiconductor circuit and storage designs for fabricating the units. The foundry may be selected from the Semiconductor Industry Association Directory, available from the Semiconductor Industry Association, 181 Metro Drive, Suite 450, San Jose, Calif. 95110, USA.

FIG. 2A discloses communication protocol stacks 200 for the mobile device or phone 102, gateway 108 and home network 112 according to an embodiment of the present invention, and as shown in FIG. 1. A Bluetooth protocol stack 202 for the phone includes an application layer 208 responsible for managing communications between host applications and implementing the functionality of Bluetooth profiles. Among the profiles implementing an application is a Service Discovery Protocol (SDP), which enables Bluetooth devices to discover what services other Bluetooth devices support, as previously described above. An Object Exchange (OBEX) profile provides exchange of arbitrary data objects. An RFCOMM layer 210 provides data transfer and signaling. A logical link control adaptation protocol (L2CAP) layer 212 takes data from higher layers of the Bluetooth stack and from applications and sends it over lower layers of the stack or directly to a link manager (LM) layer 216. A host controller interface (HCI) layer 214 handles communication between a separate host and a Bluetooth module. The link manager 216 controls and configures the links to other devices. A link controller layer 218 controls a physical link via the radio, assembling packets and controlling frequency hopping. A baseband layer 220 is responsible for channel coding and decoding; lower level timing control and management of the link within the domain of a single data packet transfer. A radio layer 222 modulates and demodulates data for transmission and reception on an air link to/from the gateway.

Another embodiment of the invention supports service discovery protocols in Personal Area Networks (PAN) which are described in IEEE standard 802.15.2. The standard adopted portions of the stack 202 for applications, including layers 212; 216; combined layers 218 and 220, and layer 222. The modified stack 202 (not shown) facilitates lower power consumption, lower cost and ease of use in ad hoc networks.

Further details on the Bluetooth and PAN stacks are described in the text "Bluetooth Connect Without Cables" Second Edition by J. Bray and C. F. Sturman, published by Prentice Hall PTR, Upper Saddle River, N.J. 07458 pages 25-148/511-512 (2000, 2001) (ISBN-13-066101-6), which is fully incorporated herein by reference.

A gateway stack 204 interfaces with the Bluetooth (BT) stack 202 via a first protocol stack $204^1$ and interfaces with a Wireless Local Area Network protocol stack 206 via a second protocol stack $204^2$. The protocol stack $204^1$ includes a service discovery application layer $221^1$ using service discovery mechanisms 223, such as Bluetooth Service Discovery Protocol or Universal Plug and Play (UPnP) to obtain information on services available in proximity devices or networks. The service discovery application layer $221^1$ stores and maintains information in a service description database 123 (see FIG. 2) included in the gateway. A Service Discovery Protocol layer 223 is responsive to the application layer $221^1$ for discovery purposes. The protocol stack $204^1$ further includes identical layers to those included in the Bluetooth stack 202 plus a Bluetooth device manager 237. The device manager acts as a translator between applications and the functional blocks of the Bluetooth protocol stack. When applications request links, they request them from the device manager. When application wishes to discovery devices in the neighboring neighborhood, those requests go through the device manager. Configuration control and information on a neighborhood passes through the device manager. However, the transfer of all data does not involve the device manager.

The protocol stack $204^2$ in the gateway interacts with devices and services in the home network via WLAN 114 (see FIG. 1) using for example the IEEE 802.11 standard. The primary service of the 802.11 standard is to deliver Media Access Control data units between peer logical link controllers. The functional units which support networking in a WLAN include an Upper layer 227; a Logical Link Controller layer (LLC) 228; a Media Access Control (MAC) layer 230, and a Physical layer 232. The Upper Layer provides the communication protocols, typically Transport Control Protocol (TCP) or User Datagram Protocol (UDP) and Internet Protocol (IP) to establish end to end communication application software with devices on the network. The Logical Link Layer exchanges data between end users across the WLAN using an 802-based MAC-controlled link. The logical link control provides addressing and data link control and is independent of the topology, transmission medium and medium access control techniques. The MAC layer 230 performs addressing and recognition of frames in support of the LLC. The Physical layer 232 is responsible for the electrical interface to the communications media including modulation and channel codings. The LLC and MAC/PHY layers are further described in IEEE 802.2 (LLC) and IEEE 802.11 (Wireless), respectively.

The Upper Layer using e.g. TCP/IP passes user data down to the LLC expecting error free transmission across the network. The LLC appends a control header, creating an LLC protocol data unit. The LLC utilizes the control information in the operation of the LLC protocol. Before transmission, the LLC data unit is handed down to a MAC service access point. The MAC layer appends control information at the beginning and end of the packet forming a MAC frame. The control information in the frame is needed for the operation of the MAC protocol. The gateway interface $204^2$ interacts with a device interface 206 in the home network via the WLAN, the device interface 206 having the same layers as in the interface $204^2$. Further details on the IEEE 802.11 protocol stack are described in the text "Wireless Lans Implementing Interoperable Networks" by J. Geier, published by McMillian Technical Publishing, New York, N.Y., Chapter 3, (1999) (Library of Congress Book Number 1-57870-081-7), fully incorporated herein by reference.

Message flow in the gateway begins with the mobile device generating a message in the application layer 208 which passes down the Bluetooth stack and transmitted by the radio layer 222 to the gateway via the air link. The message may be intended for discovery or an input to a device in the home network. In any case, the message is received by the radio layer 245 in the gateway stack $204^2$ and passed up the to the service discovery application layer 221 for implementation and response to the mobile device or transmission to the home network. In the case of a response message, the response may contain service discovery information stored in the service description database 123 (see FIG. 2A). The response is transmitted back down the protocol stack $204^1$; across the air link, and up the stack 202 to the application layer 206 for display to the user.

In the case of a device input message, the layer 221 passes the message to the upper layer 227 in the protocol stack $204^2$. The message is passed down the stack $204^2$ to the physical layer 232 which links to the physical layer $232^1$ of the device. The message is received in the protocol stack 206 and travels up the stack to the upper layer as an input to the associated device. Any device response travels the same path in reverse through the device stack 206, the gateway stacks 204² and 204¹ to the Bluetooth stack 202, thence to user via the application layer 208.

A representative message format 240 for a Bluetooth RFCOMM transmission is shown in FIG. 2B. The format shows the location and size of the fields in the message. The format includes an address field 242, a control field 242, a message link field 244 and a length or data field 246. A main data field 248 carries the message data and a frequency check sequence 250 is used to check for error in the packet. Further details on an RFCOMM message are described in the text "Bluetooth Connect Without Cables", supra at page 182.

FIG. 2C discloses a representative message format 260 for an IEEE 802.11 transmission. The message includes a frame control field 262 which carries control information being sent from station to station. A duration/ID field 264 contains a duration value depending on the type of frame sent. An address field 266 contains different types of addresses depending on the type of frame being sent. A sequence control field 268 describes a fragment number subfield indicating a fragment number of an LLC data unit. A frame body field 270 corrects information pertaining to the specific field. A frequency check sequence frame 272 checks for transmission errors in the frame. Further details on an IEEE 802.11 message format are described in the text "Wireless Lans Implementing Interoperable networks", supra at pages 142-144.

The gateway further includes a message translation table (not shown) stored in the ROM 121 (see FIG. 2) for translating Bluetooth messages to correspond with IEEE 802.11 message format, and vice versa, enabling the operation of a selected 802.11-based device to be controlled by the Bluetooth mobile device. The gateway accesses the table for each request messages from each Bluetooth device to an 802.11 based device served by the gateway; uses the table to translate the Bluetooth message to an IEEE 802.11 message for implementation by the selected 802.11 based device; uses the table to translate a device 802.11 response message into a Bluetooth message for the requesting Bluetooth mobile device, and provides the 802.11 response message from the selected 802.11 based device to the requesting Bluetooth device via the protocol stacks, described in FIG. 2A . The processing unit 113 (see FIG. 2A) includes software for translating the Bluetooth messages and the IEEE 802.11 messages to their counterpart messages.

FIG. 3 describes a system 300 which is an abbreviated representation of the system 100 described in FIG. 1 according to an embodiment of the present invention. A mobile device 302 in a first network interacts with a gateway 304 to control support/service devices 306¹ . . . 306ᴺ in a second network without the need for an interface in the mobile device to communicate with the support/service devices. The gateway 304 includes a service discovery application 308 and a service description database 310. The application implements one or more service discovery protocols. The discovery mechanisms dynamically discover available services in a network and provide the mobile device with necessary information to search and browse for services; choose the right service with desired characteristics, and utilize the service. A variety of service discovery protocols are currently available. The most well known includes Bluetooth service discovery protocol (SDP) developed by the Bluetooth SIG group; service location protocol (SLP), developed by the IETF; and the Universal Plug n Play (UPnP), developed by the UPnP Forum. The gateway conducts discovery within the Bluetooth and the WLAN networks as well as outside these networks.

According to embodiments of the present invention, the gateway may serve as a service discovery device providing the mobile device 302 with available service information and suitable UI for the services. A control link 303 may be directly from the mobile device to the Device 306″ where discovered services are BT based. Alternatively, a control link 305 may be coupled to the Devices via a PHY layer 307 in the gateway when the services are WLAN or Bluetooth based.

FIG. 3A describes a Bluetooth SDP protocol 312 between a SDP client 314, the gateway, and an SDP server 316 within the Bluetooth networks. The protocol involves a link controller connection setup phase 318; a link manager connection setup 320; a L2CAP connection setup 322; a SDP session 324 and a disconnect phase 326. The signaling and message steps of the protocol are shown from an inquiry step to the terminate connection step. Details of the protocol steps are described in the text "Bluetooth connect without cables", supra pages 196-223.

The application 308 stores and maintains information on services available in proximity devices or networks in a service description database 310. The discovered services are stored in the database 123 (see FIG. 2) as records 330, which describe the services a Bluetooth device can offer to another Bluetooth device. As shown in FIG. 3B, each service is described by a plurality of items including, for example, a service record handle 332 which is a 32 bit number uniquely identifying its service record within a service. A service class ID list 334 describes the type of services covered by the record. A protocol descriptor list of 336 describes the protocols needed to use the service. A Bluetooth profile description list 338 describes a list of Bluetooth profiles supported by the server. A service name 340 and other necessary items support different types of devices. The records are updated by various methods including service discovery protocols, and monitoring network traffic using e.g. Ad hoc On Demand Distance Vector routing (AODV), etc. The recorded information is converted into suitable format such as XML, JAVA applet, Micro Media Flash, WML or HTML documents for transmission to the Bluetooth devices.

Returning to FIG. 3, The SDP information may be pushed to the mobile device or phone 302. One particular mechanism that may be used to transfer the information is object exchange (OBEX). A description of OBEX is included in the text "Bluetooth 1.1 connects without cables" supra at pages 237-250. At least 3 different profiles may be established to push the information to the services. These profiles may include periodically transmitting the information, transmitting changes that have happen or some preselected services available and by manual request. The application 308 interacts with a service directory user interface to be described hereinafter in FIG. 4. The interface may be stored in the gateway and uploaded to the phone or stored in the phone. The interface 342 enables the service information pushed to the user to be browsed by the user. Once the user selects a particular service in the directory, a service specific interface 344 is launched and displayed to the user to control the service. The gateway may transfer suitable JAVA applets or links to the phone for monitoring network routing messages to determine available nodes. If so decided by the user, the gateway can query available services from the nodes and construct multi-level documents of the services. When a service is selected from the UI, the gateway or the phone initiates the application between two chosen peers.

There are several options that may allow the mobile phone to launch certain specific user interfaces (such as a media player for MP3 files). The specific interface may be part of preinstalled software in the mobile device. Alternatively the specific service interface may be downloaded from the gateway or remotely via an internet/cellular connection.

When the mobile phone receives a set of service/content descriptions from the gateway, the descriptions are rendered using output devices of the phone to present to the user interface as a service guide to the user. The main output device for the user interface rendering the descriptions is the phone display. However, voice synthesis with or without voice recognition may be used as an alternative to a fully visual user interface.

Service description sent by the gateway to the phone contains information on services/content discovered by the gateway. Any additional services/content discovered by the phone can be either presented in the user interface separately from the services discovered by the gateway, or it can be combined so as to provide a uniform user interface view of available service/content, regardless of how they were discovered.

Figure 4B:
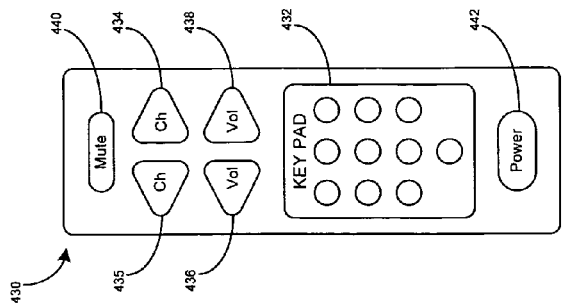
FIG. 4B is a representation of another service specific interface of FIG. 3 according to an embodiment of the present invention.
Figure 4A:
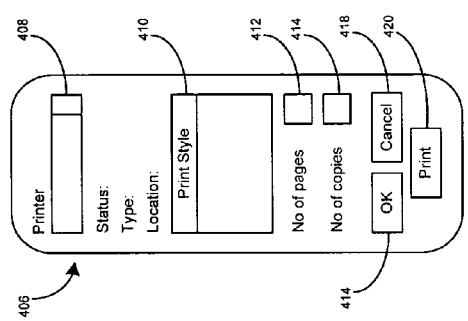
FIG. 4A is a representation of a specific service user interface of FIG. 3 according to an embodiment of the present invention.
Figure 4:
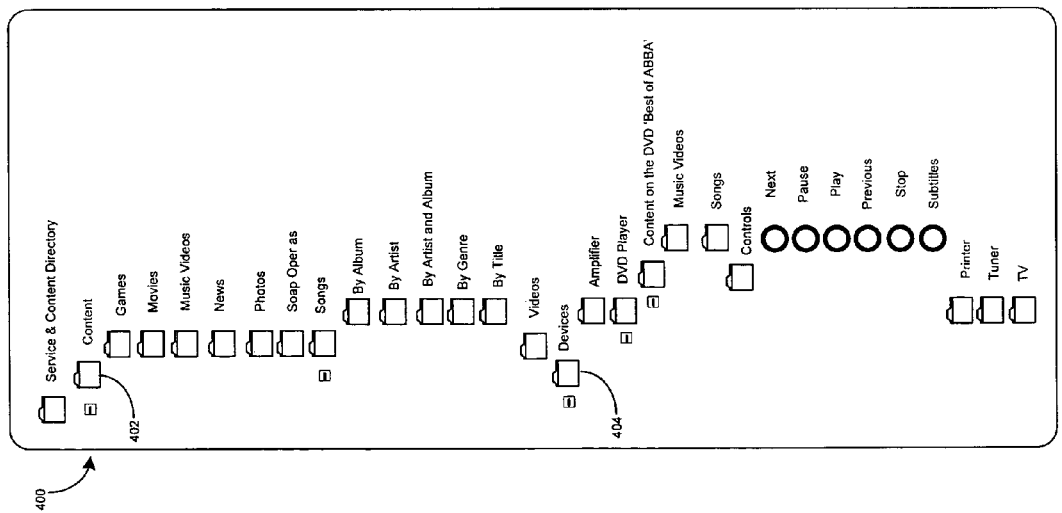
FIG. 4 is a representation of a Service Directory User Interface for display in the mobile device of FIG. 3 according to an embodiment of the present invention.

FIG. 4 describes one embodiment of a service and content directory 400 stored in a gateway. The interface includes a content directory 402 subdivided into games, movies, music videos, news, photos, soap operas and songs. The songs are further subdivided into album, artist, artist and album, genre and title. The content directory also provides a subdirectory of videos. The content directory is further divided into a list of devices 404 which may be included in a home network. As shown in FIG. 1, the devices included in the home network may be an amplifier, a DVD player, a printer, a tuner and TV. The DVD player may be further divided into content on the DVD "best of ABBA", to further subdivide it into music videos and songs. The DVD player also includes control with buttons for next, pause, play, previous, stop, and titles, typical examples of system of operation are described in FIGS. 5 and 6. After user selection of content and device, the service specific interface is launched as previously described. The services may include both Bluetooth- and WLAN-based services so that the user doesn't have to worry about the connecting technology.

FIG. 4A is a representation of one embodiment of a service-specific user interface 406 for a printer. The interface is stored in the mobile device and displayed after selection from the service and content directory. The interface may also be provided by the gateway. The interface includes a printer selection line 408 followed by indications of status, types and location. A print style window 410 allows for the selection of the print style. A button 412 enables the user to select the number of printed pages. A button 414 allows the user to select the number of copies. An OK button 416, and a cancel button 418 allow the user to accept or reject the selections in the printer window and print style windows. A print button 420, when actuated, transfers the specific service interface selections via a first wireless network to the gateway. The interface signals are translated by the gateway into signals for operating the selected printer and transmitted via a second wireless network to the selected printer for execution without the phone incorporating a WLAN interface for operating the selected printer.

FIG. 4B is a representation of one embodiment of another service-specific user interface 430 for controlling a TV. The interface 430 replicates a standard remote control unit. Included in the TV controller is a key pad 432 for selecting TV channels. A channel button 434 increases the channel selection while a channel button 435 reduces the channel selection. A volume button 436 increases the sound level while a volume button 438 reduces a sound level. A mute button 440 squelches any sound. A power button 442 activates or turns off a remote TV selected by the user from the service and content directory 400. The interface signals are translated by the gateway into signals for operating the selected TV and transmitted via a second wireless network to the selected TV for execution without the phone incorporating a WLAN interface for operating the selected TV.

The gateway enables multiple phones in a home network to individually operate different devices in the home network at the same time.

Figure 5:
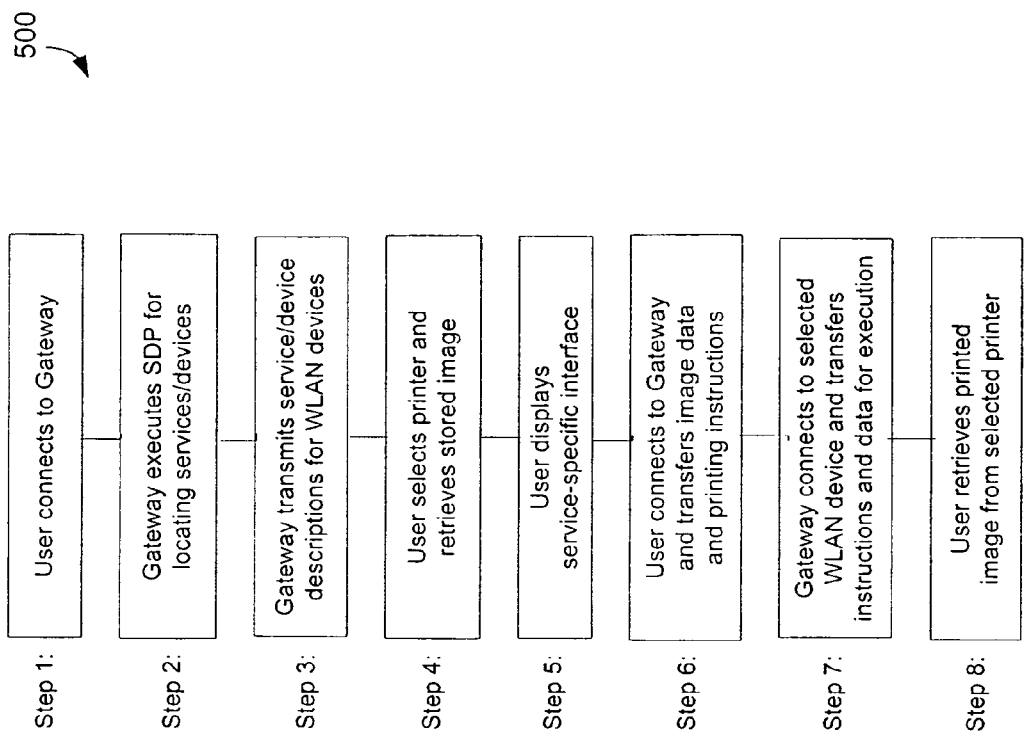
FIG. 5 is a flow diagram enabling a Bluetooth phone in a first wireless network to discover and control a printing device in a second wireless network without a printer interface, according to an embodiment of the present invention and the system of FIG. 1.
Figure 6:
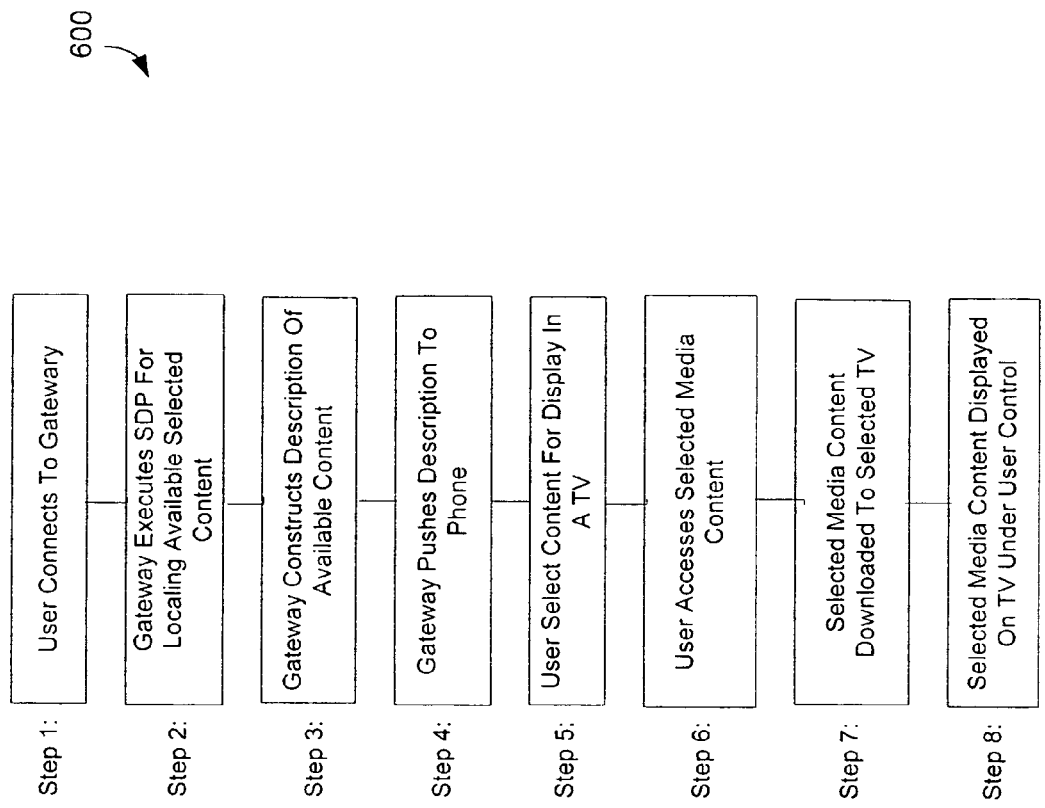
FIG. 6 is a flow diagram according to an embodiment of the present invention enabling a Bluetooth phone in a first wireless network to discover, select and control media content for display in a display device in a second wireless network without a display interface; according to the system of FIG. 1.

FIGS. 5 and 6 describe typical operations of a wireless gateway enabling Bluetooth devices to discover and interact with WLAN-based services/devices without the requirement for a WLAN based interface according to embodiments of the present invention.

FIG. 5 describes steps in a process 500 enabling a user in a Bluetooth network to control a printer in a second wireless network or LAN network for printing an image stored in the Bluetooth device.

Step 1: The user activates the gateway by establishing a connection using e.g. the Bluetooth inquiry and paging protocols to form the connection with the mobile device or phone acting as the master device and the gateway acting as the slave device. The connection setup is described in the text "Bluetooth 1.1 connect without cables", supra, pages 13-16. A service/content directory 400 (see FIG. 4) is displayed on the phone after the connection and a service or device is selected by the user from the interface 400.

Step 2: The gateway receives the Bluetooth messages for locating and identifying a printing device according to the user's requirement. The gateway searches within a user home network or outside the home network as the case may be for available devices. The gateway uses the Bluetooth service discovery protocol described in FIG. 3A to locate available printing devices. According to embodiments of the present invention, the gateway device may perform the service discovery using both WLAN and Bluetooth or other technologies such as Ultra Wide Band (UWB) or Service Location Protocol (SLP), so that the found services are not limited to a single technology. If the service is Bluetooth-based, the terminal could use the direct control link 303 as in FIG. 3, or if the terminal is WLAN-based, the control link 305 could be through the gateway device.

Step 3: The gateway, after locating available printing device(s) constructs descriptions of the printers from the service description database 123 (FIG. 1) and initiates a connection with the requesting phone.

Step 4: The description is pushed to the phone while the gateway periodically repeats steps 2-4. The user chooses the printer from a service list transmitted by the gateway. An image is selected by the user from an image gallery stored in the phone.

Step 5: A service-specific interface is provided to the user, for example, FIG. 4B to select the printing details in terms of styles, copies and the like.

Step 6: The device transmits the stored image data with printing instructions to the gateway.

Step 7: The gateway translates the instructions and stored image data into WLAN format and transmits the stored image data and instructions via the WLAN network to the selected printer for execution.

Step 8; The device retrieves the image from the printer identified in the service listing and the process ends.

The printing process 500 further includes the gateway checking a description for changes before transmitting. The description is only sent if changed since it was last transmitted to the phone. In another alternative, the gateway only sends the description whenever requested by the mobile device, in which case, the mobile device receives a list of available printer services from the gateway. The description may be executable code.

FIG. 6 describes steps in a process 600 enabling a user to locate currently available media content for display on a TV or media device.

Step 1: A user connects to the gateway to locate selected available media after display of the service/content directory.

Step 2: The gateway automatically searches for descriptions of content available on media services in one or more access networks using any and all relevant/applicable service discovery methods.

Step 3: The gateway constructs a description of the available media content.

Step 4: The gateway, after connection to the user via standard Bluetooth protocol, pushes the descriptions over BT to the mobile phone. After the information is pushed, the gateway repeats steps 2-4.

Step 5: The user selects the media content from the pushed descriptions displayed in the TV.

Step 6: The user connects to the gateway and finds the media content or descriptions of the content from a media guide. The media content may include, for example, transport parameters, media codec parameters, availability and time, and human readable description of the content.

Step 7: The phone software downloads the media content to the selected video device.

Step 8: The user, while connected to the gateway, operates the service-specific interface shown in FIG. 4B to control the display of the media in the selected video device, and the process concludes when the media content ends.

The process 600 may further provide content available, e.g., point-to-point by Unicast IP or point-to-multipoint via multicast IP. The content may be transmitted unsolicited or in response to a user's request. The description format may include an IP-CC format as well as other formats based on the Internet Media Guide (IMG) framework being standardized in the IETF.

Figure 7:
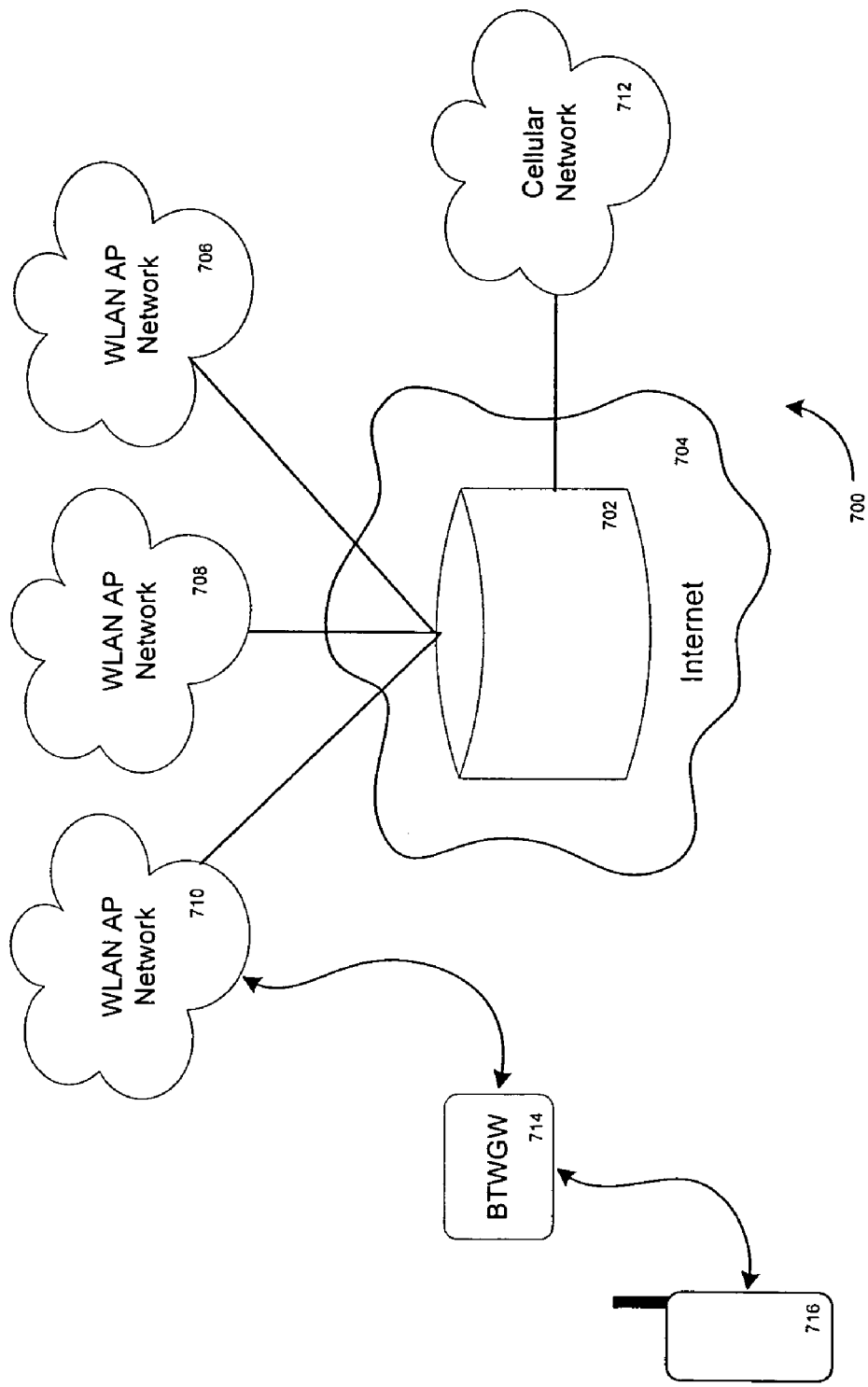
FIG. 7 is a representation of another embodiment of FIG. 1 providing the Bluetooth phones or terminals with extended services/devices in multiple WLAN networks and access to a cellular network via a UMA controller.

FIG. 7, discloses another embodiment of the gateway providing a mobile phone access to cellular network through a WLAN network, using Unlicensed Mobile Access (UMA) technology. The general idea of UMA technology is to have a network element, namely a UMA network controller, which serves as a gateway between local area networks and a cellular network. The UMA network controller provides subscriber terminals or mobile phones access to a cellular network independently of the current access point serving the terminal. Thus, each local area Access Point having connection to a backbone network is capable of connecting the terminal to a UMA controller, which provides access to the cellular network and cellular network services.

FIG. 7 discloses the Gateway-UMA architecture 700, including a UMA controller 702 located in an Internet 704 at a Uniform Resource Locator (URL). The controller is described in a specification published by the Unlicensed Mobile Access Consortium on September 4, 2004 and is available from members of the Consortium, including Nokia Corporation, assignee of the present invention. The controller is coupled to a plurality of WLAN access point networks 706, 708, 710 and to a cellular network 712 for available service. One or more networks, 706, 708 and 710 are connected to the gateway 714 serving one or more mobile phones 716, as described in FIG. 1. The architecture 700 enables the gateway 714 to provide the mobile phone 716 with an interface to connect to a WLAN access point 710 and via the controller 702 to the Internet 704 and the cellular network 712 for cellular services. The gateway can use service discovery protocols to identify available services through the UMA controller 702 and the Internet. The gateway 714 can provide a user with a service specific interface through the mobile phone after a selection is made from the service directory user interface, as described in FIG. 3. After selection of a service or device in a network, the gateway provides the necessary protocol conversions during terminal or phone interaction with the UMA controller, emulating the WLAN terminal to the local area network and emulating the Bluetooth AP providing access to the cellular network to the mobile phone.

While the invention has been shown and described in a preferred embodiment, various changes can be made therein without departing from the spirit and scope of the invention as described in the appended claims, in which.

We claim:

1. A communication method, comprising:
providing connectivity and protocol conversion enabling communication between a first wireless network and at least a second wireless network
by conducting a service discovery protocol at a portable gateway for providing information relating to discovered services and/or devices within the first and the at least second wireless networks in response to requests from a paired wireless device coupled to the first network, the portable gateway monitoring, querying and recording available services for proactive delivery to the paired wireless device; and
providing a user interface unloaded to the paired wireless device to interact with information relating to the discovered services and/or devices within the first and the at least second wireless networks.

2. The communication method of claim 1 wherein the protocol conversion is made only to services/devices discovered in the at least second network.

3. The method of claim 1 further comprising:
storing descriptions in records of services and/or devices coupled to the first and to the at least second wireless networks in a service description database.

4. The method of claim 1 further comprising:
storing a service and content directory in the gateway and downloading the directory to the wireless device for display.

5. The method of claim 1 further comprising:
pushing information collected by the gateway to the wireless device.

6. The method of claim 1 further comprising:
providing a specific service user interface to the wireless device after selection of service and/or device in a service directory user interface, wherein the service specific user interface is tailored for each of the discovered services and/or devices.

7. The method of claim 1 further comprising:
storing a service discovery application in the gateway to interact with a service directory user interface enabling the service information to be browsed by the wireless device.

8. The method of claim 6 further comprising:
pushing the specific service interface to the wireless device by the gateway after selection of the service and/or device.

9. A communication system comprising:
a portable gateway configured to provide connectivity and protocol conversion enabling communication between a first wireless network and at least a second wireless network
by execution of service and device discovery software installed in the portable gateway and to provide information relating to discovered services and/or devices within the first and the at least second wireless networks to a wireless device coupled to the first network, the portable gateway further being configured to be paired with the wireless device and monitor, query and record available services for proactive delivery to the paired wireless device; and the wireless device configured to display a service and content directory for selection of and interaction with the discovered services and/or devices within the first and the at least second wireless networks based on the information received from the paired portable gateway.

10. The system of claim 9 wherein the protocol conversion is made only to services/devices discovered in the at least second network.

11. The system of claim 9 further comprising:
a service and content directory stored in the gateway and downloadable to the wireless device for display.

12. A gateway, comprising:
a first transceiver configured to couple to a first wireless network;
at least one second transceiver configured to coupled to at least a second wireless network; and
a processor configured to:
conduct pairing with a wireless device coupled to a first network;
provide connectivity and protocol conversion enabling communication between the first wireless network and the at least one second wireless network
by executing a service discovery protocol for providing information relating to discovered services and/or devices within the first and the at least second wireless networks in response to requests from the paired wireless and,
monitor, query and record available services for proactive delivery to the paired wireless device.

13. The gateway of claim 12 wherein the protocol conversion is made only to services/devices discovered in the at least second network.

14. The gateway of claim 12 further comprising:
descriptions in records of devices and services coupled to the second network stored in a service description database.

15. The gateway of claim 14 further comprising:
the service description database stored in a memory and configured to store descriptions in records of services and devices constructed from discovered information.

16. The gateway of claim 12 further comprising:
a service discovery application configured to interact with a service directory user interface enabling discovered service information to be browsed by the wireless device.

17. The gateway of claim 12 further comprising:
a specific service interface configured to be downloadable from the gateway to a wireless device for display.

18. The gateway of claim 12 further comprising:
a conversion module configured to convert between MPEG4 and MPEG2.

19. The gateway of claim 12 wherein the gateway operates as an access point capable of serving a plurality of wireless devices in a home network.

20. The gateway of claim 12 wherein the first network implements Bluetooth protocols.

21. The gateway of claim 12 wherein the second network implements IEEE 802.11 protocols.

22. A computer program comprising computer executable code stored on a computer readable memory medium, comprising:
computer readable program code configured to connect to a first wireless network;
a computer readable program code configured to connect to at least a second wireless network;
a computer readable program code configured to conduct pairing with a wireless device coupled to the first network;
a computer readable program code configured to execute a service discovery protocol for providing information relating services and/or devices within the first and the at least second wireless networks in response to requests from the paired wireless device; and
a computer readable program code configured to monitor, query and record available services for proactive delivery to the wireless device.

23. The computer program of claim 22 further comprising:
a computer readable program code configured to interact with a service directory user interface enabling discovered service information to be browsed by a wireless device.

24. A communication method, comprising:
providing connectivity and protocol conversion enabling communication between a first wireless network and at least a second wireless network;
providing extended connectivity and protocol conversion to at least a third wireless network via an Unlicensed Mobile Access (UMA) controller coupled to an information distribution network through the second wireless network
by conducting a service discovery protocol in a portable gateway for providing information relating to discovered services and/or devices within the first and the at least second or third wireless networks in response to requests from a paired wireless device coupled to the first network, the portable gateway monitoring, querying and recording available services for proactive delivery to the wireless device; and
providing a user interface uploaded to the paired wireless device to interact with information relating to the discovered services and/or devices within the first and the at least second or third wireless networks.

25. The communication method of claim 24 wherein the gateway
(i) discovers the second network providing network connection availability to the UMA controller, and (ii) provides a list of available services to the wireless device from the at least third network.

26. A gateway, comprising:
a processor configured to:
conduct pairing with a wireless device coupled to a first network;
provide conversion and connectivity enabling communication between a first wireless network and at least one second wireless network;
provide extended connectivity and protocol conversion to the wireless device and to at least a third wireless network; an information distribution network or the Internet and a cellular network via an Unlicensed Mobile Access (UMA) controller;
provide a service discovery protocol for providing information relating to services and/or devices within the first and the at least second or third wireless networks in response to requests from a the paired wireless device; and
monitor, query and record available services for proactive delivery to the paired wireless device.

27. The gateway of claim 26 further comprising:
connect the wireless device to the cellular network for cellular services via the UMA controller.

28. An apparatus comprising a processor configured to:
provide connectivity and protocol conversion enabling communication between a first wireless network and at least a second wireless network;
access through the second wireless network an Unlicensed Mobile Access (UMA) controller coupled to an information distribution network and to a cellular network;
conduct a service discovery protocol providing information relating to discovered services and/or devices within the first and the at least second or cellular networks in response to requests from a paired wireless device coupled to the first network;
monitor, query and record available services for proactive delivery to the paired wireless device; and
upload a user interface to the paired wireless device for interacting with information relating to the discovered services and/or devices within the first and the at least second or cellular networks.

29. The apparatus of claim 28 wherein the processor is further configured to:
connect the wireless device to the cellular network for cellular services via the UMA controller.

30. A computer program comprising executable code stored on a computer readable memory medium, comprising:
computer readable program code configured to
provide connectivity and protocol conversion enabling communication between a first wireless network and at least a second wireless network via a connection gateway;
a computer readable program code configured to provide extended connectivity and protocol conversion to at least a third wireless network via an Unlicensed Mobile Access (UMA) controller coupled to an information distribution network and to a cellular network;
a computer readable program code configured to execute a service discovery protocol for providing information relating to discovered services and/or devices within the first and the at least second or cellular networks in response to requests from a paired wireless device coupled to the first network;
a computer readable program code configured to monitor, query and record available services for proactive delivery to the paired wireless device; and
a computer readable program code configured to upload a user interface to the wireless device to interact with information relating to the discovered services and/or devices within the first and the at least second or cellular networks.

31. A communication device comprising:
a semiconductor chip set, providing connectivity and protocol conversion enabling communication between a first wireless network and at least a second wireless network by
conducting a service and device discovery protocol in a gateway providing information relating to discovered services and/or devices within the first and the at least second wireless networks in response to requests from a paired wireless device and coupled to the first network, the gateway monitoring, querying and recording available services for proactive delivery to the paired wireless device.

* * * * *